Figure 1:
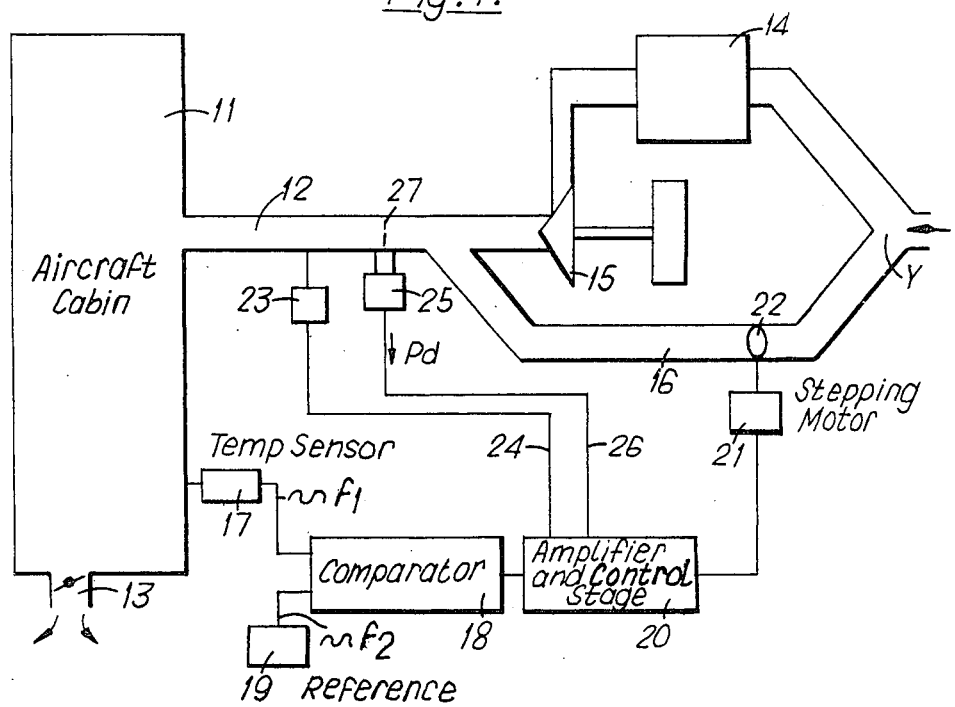

United States Patent [19]

Minett et al.

[11] 3,913,833

[45] Oct. 21, 1975

[54] AIR CONDITIONING SYSTEMS

[75] Inventors: Herbert Hargrave Basil Minett, Chalfont-St. Peter; Gordon Horsford Stockwell, St. Albans, both of England

[73] Assignee: Hawker Siddeley Dynamics Limited, England

[22] Filed: Sept. 15, 1972

[21] Appl. No.: 289,338

[30] Foreign Application Priority Data
Sept. 21, 1971 United Kingdom............... 10450/71

[52] U.S. Cl. ...................... 236/49; 73/339 A; 91/3; 137/805; 236/78; 236/80
[51] Int. Cl.² ...................... F24F 11/04; F15C 4/00
[58] Field of Search ........... 137/805, 804, 821, 826, 137/828; 236/13, 49, 76, 78, 609, 610; 91/3; 318/601; 251/133, 138; 73/357, 339 A, 362 AR; 235/151.1, 151.12; 60/39.28 T

[56] References Cited
UNITED STATES PATENTS

| | | | |
|---|---|---|---|
| 2,858,075 | 10/1958 | Le May, Jr. et al. | 236/80 X |
| 3,427,442 | 2/1969 | Sklaroff | 318/601 X |
| 3,465,962 | 9/1969 | Matulich et al. | 236/13 |
| 3,521,655 | 7/1970 | Glaze | 137/805 |
| 3,554,058 | 1/1971 | Newell | 91/3 X |
| 3,608,572 | 9/1971 | Hass | 137/805 |
| 3,613,369 | 10/1971 | Colston | 137/805 X |
| 3,630,023 | 12/1971 | Lazar | 137/85 X |
| 3,657,524 | 4/1972 | Bakke | 318/610 UX |
| 3,677,293 | 7/1972 | Furlong et al. | 137/805 X |
| 3,742,328 | 6/1973 | Ohta | 318/685 |
| 3,809,990 | 5/1974 | Kuo et al. | 318/685 |

*Primary Examiner*—William E. Wayner
*Attorney, Agent, or Firm*—Dowell & Dowell

[57] ABSTRACT

An air conditioning system, especially for aircraft cabins, has a temperature control loop incorporating a signal processing control stage, in the form of a pulse logic network, to derive, from the difference or error signal received from a comparator, a control output signal suitable for driving a regulating motor to change the air flow conditions in a fresh air duct supplying the cabin. The cabin temperature is advantageously sensed by a resonant tube acoustic device delivering a pneumatic pressure oscillating output which is compared with a reference pulse frequency in fluidic logic of the comparator to derive a pulse frequency representing the difference or error. The control stage in turn derives from the error pulse frequency the regulator driving output, which is advantageously a polyphase output driving a stepping motor.

6 Claims, 7 Drawing Figures

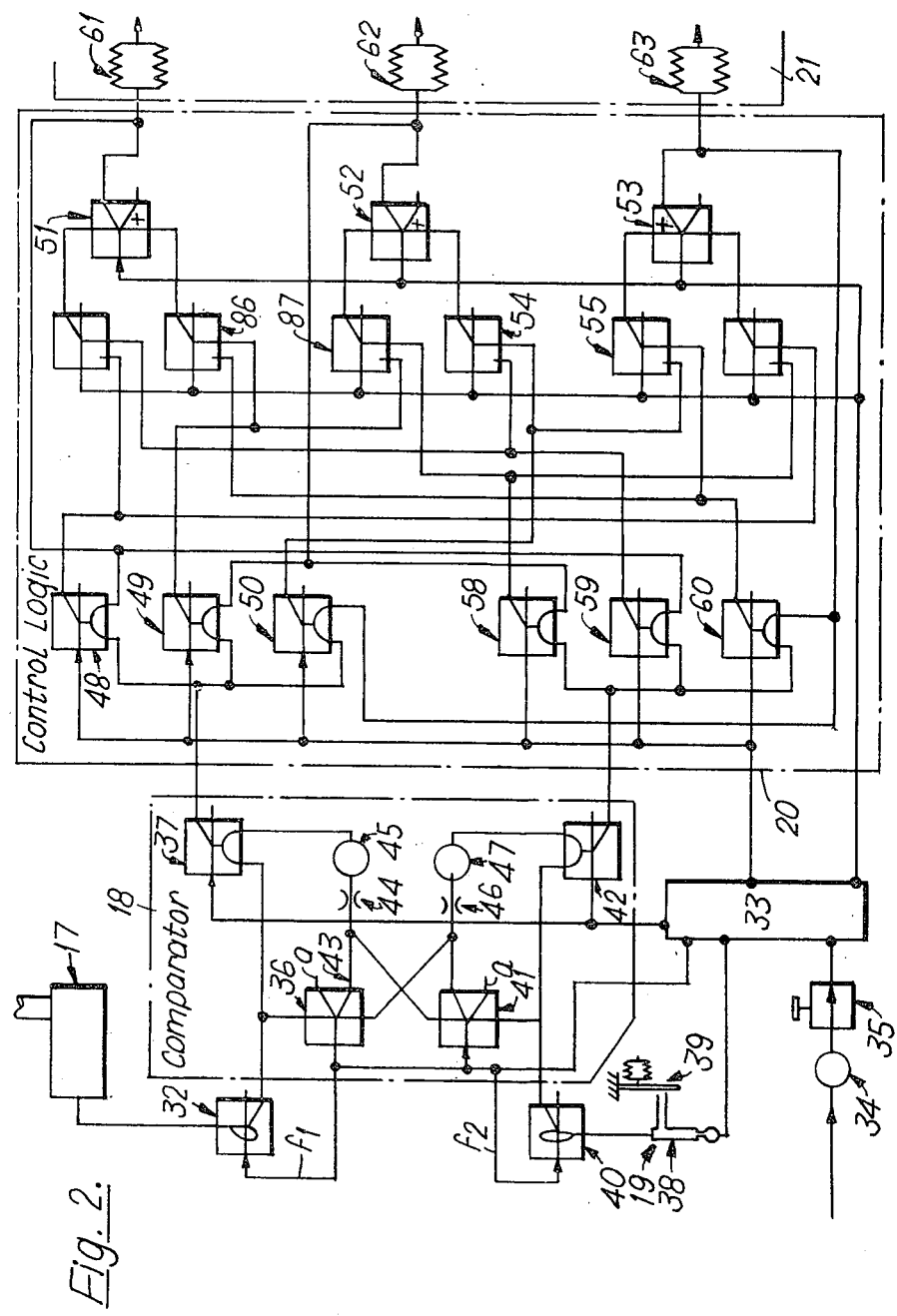

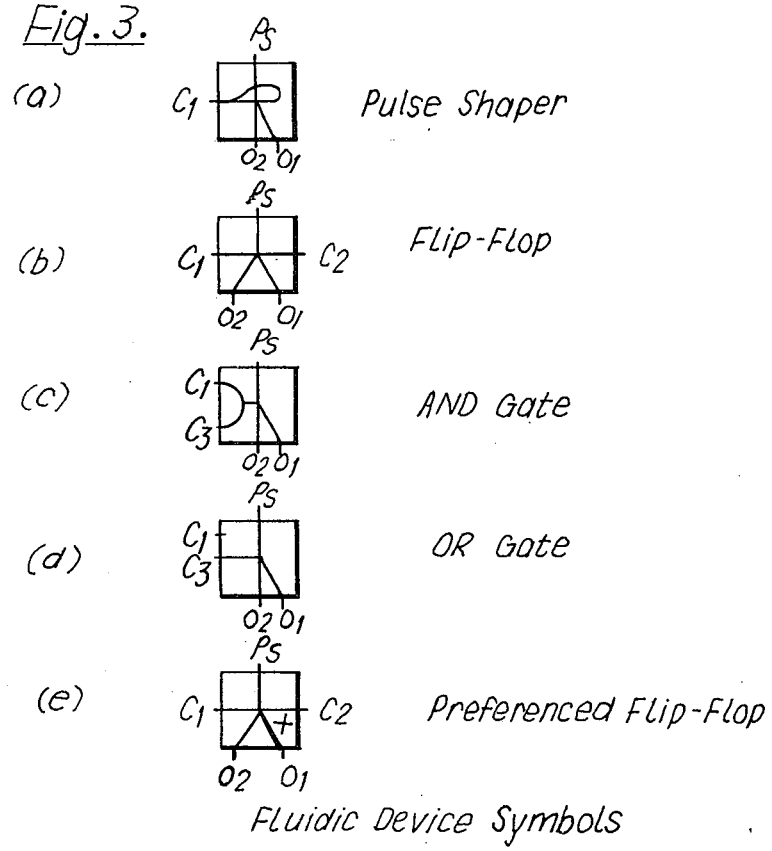
Fluidic Device Symbols
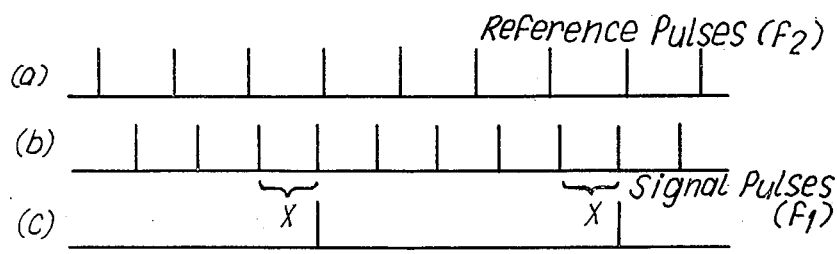

AIR CONDITIONING SYSTEMS

This invention is concerned with air conditioning systems and has particular regard to control arrangements for ensuring the stability of conditions within an enclosure outside of which the surrounding conditions may change comparatively rapidly and/or where the thermal or volumetric capacity of the system supplying the enclosure is limited.

The invention aims to achieve a control arrangement for air conditioning which is more accurate and has a better response than hitherto and has the advantage that the air conditioning system is controlled to operate more efficiently, making it more economical in power, weight and size.

According to the present invention, there is provided an air conditioning system wherein at least one parameter of the air supply to an enclosure is regulated by means of a control loop responsive to at least one sensor monitoring a parameter of the air conditions within the enclosure, the control loop including a comparator for comparing the sensor signal with a reference signal, and a signal-processing control stage receiving the difference or error signal from the comparator and delivering a control output signal or signals suitable for driving regulating means for the air supply parameter to be regulated, characterised in that at least the signal-processing control stage of the loop receives its signal input in the form of a pulse-frequency or pulse-width modulated signal and comprises an assembly of signal-pulse-responsive components forming a pulse logic network.

Preferably, the comparator also receives its signal inputs in the form of a pulse-frequency or pulse-width modulated signal and comprises an assembly of signal-pulse-responsive components forming a pulse logic network.

Both the control stage and the comparator may advantageously comprise fluidic logic components and the sensor may be a unit which delivers its output in the form of an oscillating pneumatic signal the frequency of which varies as a function of the parameter being monitored.

Figure 7:
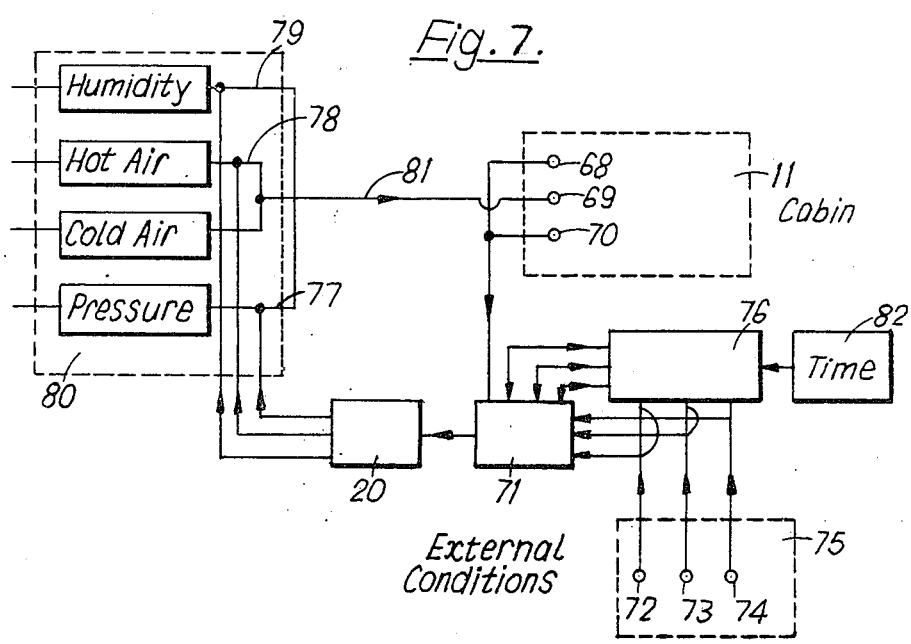
Figure 4:
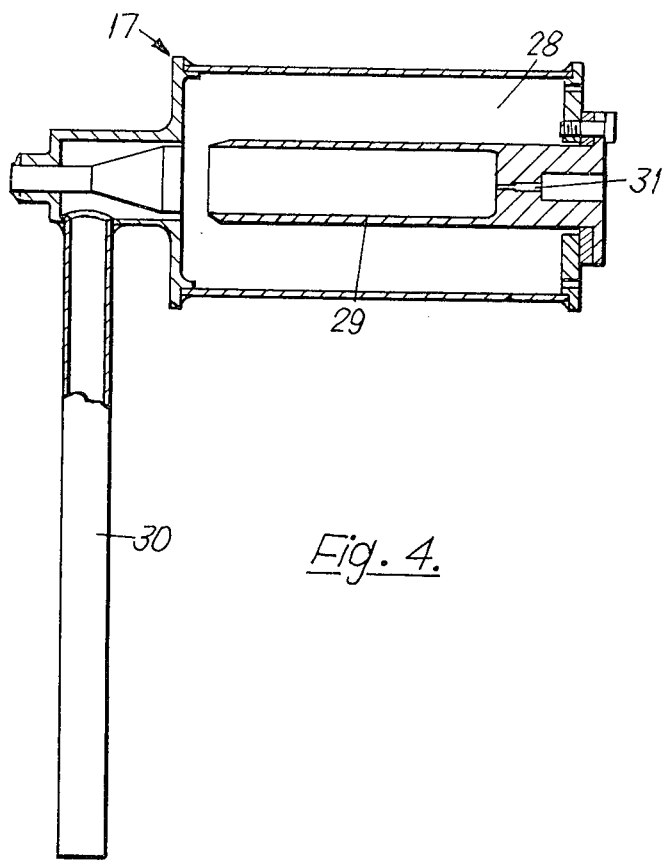
Figure 6:
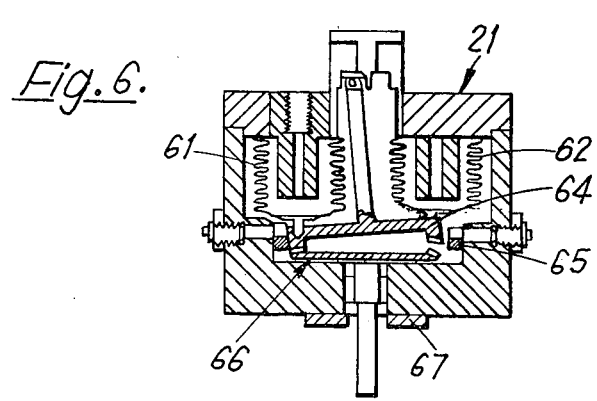

Arrangements according to the invention will now be described by way of example and with reference to the accompanying drawings, in which:

FIG. 1 is a diagram of an air conditioning system for an aircraft cabin,

FIG. 2 is a fluid circuit diagram showing how the main temperature control loop of the system of FIG. 1 can be implemented by means of fluidic devices, FIG. 3 is a key to the fluidic device symbols employed in FIG. 2, FIG. 4 shows in cross section a temperature sensor such as may be used in the circuit of FIG. 2, FIG. 5 presents pulse diagrams useful in the understanding of the operation of the circuits of FIG. 2, FIG. 6 shows in diagrammatic cross section a pneumatic stepping motor such as may be used in the system of FIG. 2, and FIG. 7 is a diagram of a modified aircraft cabin air conditioning system.

FIG. 1 shows diagrammatically an air-conditioning system for an aircraft cabin. Cold fresh air is supplied to the cabin 11 via an inlet duct 12 and stale air is vented from the cabin at an outlet 13. The incoming air in the duct 12 is cooled by being compressed, passed through a heat exchanger 14 and expanded in a turbine 15, and temperature control is obtained by permitting a variable proportion of the flow to bypass this cooling system by way of a valve-controlled bypass duct 16.

A temperature sensor 17 senses the temperature in the cabin 11 and delivers a signal representative of that temperature to a comparator 18 where it is compared with a signal from a reference source 19 representing the desired temperature level. The difference signal output from the comparator is then fed to a pulse signal-processing amplifier and control stage 20 which drives a stepping motor 21 in a direction and to an extent determined by the magnitude and sign of the difference or error between the sensed temperature and reference signals. A butterfly valve 22 in the bypass duct 16, which valve regulates the proportion of the incoming airflow that passes through the bypass duct, is adjusted by the stepping motor 21 and so the temperature control loop is completed.

The amplifier and control stage 20, can, if required, provide a limiting function in respect to such items as the maximum and minimum temperatures in the duct 12, ice formation in the duct and the rate of change of cabin temperature. Lead-lag or lag-lead function networks may also be incorporated as appropriate. FIG. 1 shows a temperature sensor 23 supplying a duct temperature signal on line 24 of the control stage 20, and also a differential pressure sensor 25 supplying to the control stage on line 26 a signal representative of the pressure differential across a screen or gauze 27 in the duct 12. Any ice build-up on the screen or gauze produces a marked rise in the pressure differential across it so that warning of ice formation is signalled.

Referring now to FIG. 2, this shows how the main temperature control loop of FIG. 1 can be implemented by means of fluidic devices. To aid understanding of the sytem of FIG. 2, a key to the symbols employed for the various fluidic devices is set out in FIG. 3.

The cabin temperature sensor 17 is such as to deliver an oscillating pressure signal the frequency of which $f_1$ is representative of the temperature sensed. A suitable acoustic device for this purpose has been described by D. Reeves and L. Airey in N.G.T.E. Note No. NT.654 and is shown in FIG. 4. It consists basically of a chamber 28 containing a resonant tube 29 responsive to the temperature sensed by a lateral probe 30, the oscillating output pressure being delivered through an orifice 31 at the base of the resonant tube. The output pressure, oscillating at a frequency representative of cabin temperature, is delivered to a pure fluid pulse shaper 32. The pneumatic power supply for this component and for all the other fluidic components in the circuit, is taken from a manifold 33 fed from a high pressure air source via a filter 34 and pressure reducing valve 35. The pulse shaper 32 converts the pressure oscillations from the temperature sensor 17 into a series of pulses, represented at $b$ in FIG. 5, whose frequency is the same as the original oscillation.

The output from the pulse shaper 32 is fed to a flip-flop 36 and one input of an AND gate 37. At the same time a reference pressure oscillation $f_2$ is generated by a conventional pneumatic back pressure sensor 38 which senses the vibration of a resonant reed 39 that is caused to vibrate at its natural frequency. The oscillating pressure reference signal from the back pressure sensor 38 is similarly converted to a pulse series form, shown at *a* in FIG. 5, by a pulse shaper 40 and fed to a flip-flop 41 and an AND gate 42. The action of the comparator circuit 18 may best be understood by referring to both FIG. 2 and FIG. 5. If a signal pulse is delivered from the pulse shaper 32 it will cause the flip-flop 36 to switch to give an output on line 43, and will also appear at one input of the AND gate 37. After a delay produced by a restrictor 44 and a volume 45 the signal on line 43 from the flip-flop will arrive at the other input of the AND gate 37. But since the signal pulse delivered directly from the pulse shaper 32 will by then already have decayed no output will result from the AND gate 37. The signal from the flip-flop 36 is also transmitted to the flip-flop 41 causing it to switch to its vented port *a*. If the next pulse fed to the comparator is received from the reference source via pulse shaper 40, this pulse will be transmitted to the AND gate 42 and to the flip-flop 41 causing it to switch and deliver an output to the second input of AND gate 42 after a delay caused by restrictor 46 and capacitance volume 47. The output from flip-flop 41 will also be fed to flip-flop 36 causing it to switch back to its vented port *a*.

A further signal pulse from pulse shaper 32 will cause the cycle to start again, with flip-flop 36 switching to line 43 and flip-flop 41 venting. If, however, due to the fact that the temperature signal frequency is higher than the reference frequency, two consecutive pulses are received from pulse shaper 32 with no intervening pulse from pulse shaper 40, as is the case at X in FIG. 5, the AND gate 37 will deliver an output when the second of these pulses arrives due to the fact that the signal pressure from the flip-flop 36 will still be present at the second input of the AND gate. A further pulse from the reference circuit will now cause the original cycle of operation to continue. The net result of the temperature signal frequency being higher than the reference frequency will be a train of pulses from AND gate 37 as illustrated at *c* in FIG. 5; but at no time will AND gate 42 deliver an output pulse. Conversely, if the temperature signal frequency is lower than the reference frequency a train of pulses will be emitted from AND gate 42 but not from AND gate 37.

Now considering an output of pulses from gate 37, these will be transmitted to one of the inputs of each of AND gates 48, 49 and 50. The other inputs of these three AND gates are connected, respectively, to outputs of three preferenced flip-flops 51, 52 and 53. In the initial start-up conditions, due to the preferencing as shown, a signal will only be available to AND gate 50 from flip-flop 53. The arrival of the first signal pulse from AND gate 37, together with the existing input from flip-flop 23, will cause the AND gate 50 to send a signal to OR gates 55 and 54 the outputs of which respectively switch OFF flip-flop 53 and switch ON flip-flop 52. The next pulse from the gate 37 will now result in AND gate 49 feeding a signal to OR gates 57 and 56 thereby switching flip-flop 52 OFF and flip-flop 51 ON. Further signal pulses will similarly cause the flip-flops to operate in the sequence 53, 52, 51, 53, 52 etc.

In the event of the temperature signal pulse frequency being lower than the reference pulse frequency, a train of pulses will be delivered from AND gate 42 to AND gates 58, 59 and 60 resulting in the operation of the preferenced flip-flops in the reverse sequence 51, 52, 53, 51, 52, etc.

The outputs from the three preferenced flip-flops 51, 52, 53 are fed, respectively, to three bellows 61, 62 and 63 incorporated in a known type of stepping motor 21 such as is shown in FIG. 6. This stepping motor was described by P. M. Blaiklok at the I.F.A.C. Symposium on Fluidics held in London, November 4–8, 1968. The sequential operation of the bellows 61 etc. causes a wobble plate 64 mounted in a gimbal ring 65 to nutate and, due to the meshing of teeth on the wobble plate with an output gear 66, an output shaft 67 is caused to rotate. The direction of rotation depends on the particular sequential order in which the bellows are operated which in turn is dependent on whether the feed pulses are from AND gate 37 or AND gate 42 of the comparator 18.

It will be understood that in FIG. 2 only the basic fluidic circuitry is shown and there may also be included, if desired, additional pneumatic digital amplifiers. These amplifiers may be of a pure fluid no-moving part type or may incorporate diaphragms, spools or like moving parts.

It will be seen that, whereas the action of a stepping motor is digital, the air duct volume will smooth out the input flow to the cabin so that changes within the cabin will be essentially smooth or analogue in character.

It should further be understood that, while the above description given with reference to FIGS. 2 to 6 of the drawings deals only with the main cabin temperature control loop of the air conditioning system, and presents this as comprising all pneumatic/fluidic circuitry, the performance of the invention is not restricted to cabin temperature control, nor to pneumatics or fluidics, nor to the use of signal pulse transmission techniques throughout the control loop, nor indeed to air conditioning systems for aircraft. The invention is clearly applicable to comparable air conditioning systems in other fields than aircraft and, with suitable transducers, can be utilised in the control of parameters other than temperature, such as air pressure, air flow rate, humidity, and so forth. Moreover, whereas it is essential that pulse signal processing techniques be employed in the control stage of the system, and that they be employed preferably also but not essentially in the comparator stage, elsewhere in the loop other systems of signal transmission may be employed, if desired, and furthermore where pulse processing techniques are in fact employed they may be other than fluid pulses, e.g., electrical, and the signal information may be transmitted, if preferred, by pulse-width modulation rather than pulse frequency technology.

Some particular substitutions or modifications that may be made in the system as described are as follows: Part or all of the control stage may employ electronic components using similar pulse techniques but with electrical pulses. In this case the stepping motor may be an electrical stepping motor. Although a three-phase motor drive output has been described, the signal processing can be arranged to provide any plural number of phases desired.

Alternatively, frequency-to-analogue conversion may be effected beyond the control stage and regulation of the air flow performed thereafter using conventional analogue techniques. In the case of fluidic pulse-width modulation, the pulses may, for example, be transmitted through some form of pneumatic resistance-capacitance network, which may indeed be provided by a conventional pneumatic actuator with restriction in the feed.

So far as the overall characteristic of the control system is concerned, it may be proportional, or integral, or both proportional and integral. Phase advance to promote system stability may also be employed.

Another possibility offered by fluidic pulse width modulation is the replacement of the stepping motor and butterfly valve regulation by a large-bore digital pure fluid switching diverter valve situated at the junction Y in FIG. 1 where the two air flow streams branch. Since the proportioning of the flows would then be of a mark/space character, the frequency of switching of such a valve would need to be sufficiently high to enable the oscillations to substantially smooth out before reaching the heat exchanger. The control signal pulses to such a valve could be either pressure or suction pulses.

As regards the input to the comparator and control stage, a sensor delivering electrical pulses, rather than fluid pulses, can be employed such as a magnetic pick-up and notched wheel device, or an opto-electronic device. Alternatively, some form of conventional analogue transducer can be employed, with conversion from an analogue to a pulse-frequency modulated or pulse-width modulated signal either in advance of the comparator, or beyond the comparator but in advance of the control stage.

To monitor air pressure or flow rate, instead of temperature, a sensor can readily be provided that will act in an equivalent manner to that of FIGS. 2 and 4, that is to say giving its output in the form of an oscillating pneumatic signal with the frequency of oscillation dependent on the value of the parameter being monitored. Both parameters can be treated as pressures, since flow rate is determined by the pressure differential across a restriction, and a variant of the Helmholtz resonator can be employed, or alternatively a pure fluid feedback oscillator comprising a conventional wall attachment amplifier, such amplifiers being well known to be sensitive to supply pressure variations.

A further interesting possibility is the introduction into the control loop of signal values representing external conditions likely to influence the internal conditions of the enclosure being air-conditioned. Thus, in the case of an aircraft cabin, external conditions might be the temperature, pressure and humidity of the ambient atmosphere outside the aircraft.

With the advent of supersonic transport and military aircraft where more dramatic changes in speed and altitude occur, the system may be extended to include a scheduling controller whereby the differences between signal values representing external conditions and cabin conditions are compared against a schedule of difference values based upon known or designed performance of the system at any operating condition, the scheduling controller then serving to initiate restorative control at a rate commensurate with system capability and dependent on the changes that occur in external conditions and cabin conditions.

Such a system is shown diagrammatically in FIG. 7. Sensors 68, 69 and 70 monitor temperature, pressure and humidity in the cabin 11 and deliver their output signals to the comparator stage 71 where comparison takes place with corresponding temperature, pressure and humidity signals obtained from sensors 72, 73, 74 monitoring the external environment 75. The difference signals so derived, and also the signals from the external environment sensors 72, 73, 74, are fed to the scheduling controller 76 which compares the incoming difference signals with stored schedule difference signals appropriate to the incoming external environment signals and transmits back to the comparator stage 71, if necessary, appropriate amending signals for supplementing or modifying the comparator-derived difference signals before they are transmitted to the control process stage 20. The control stage 20 then feeds control output signals to various appropriate control points 77, 78, 79 of the air conditioning system 80, shown in stylised form, for regulating temperature, pressure and humidity in the air supply 81 to the aircraft cabin 11. The controller 76 will conveniently have its own pulse generator or time clock 82 to provide a real time reference for the changes occurring in the various signals handled by the controller.

It will be readily understood that changes of aircraft speed and altitude change the rate at which the external environmental conditions affect both the working of the air conditioning system and the internal cabin conditions. If rate of ascent or descent changes markedly or the aircraft accelerates or decelerates markedly then the time in which the system must react to maintain comfort will vary accordingly.

The system of FIG. 7, wih a scheduling controller responsive to the external environment, fulfils these control requirements and provides a measure of anticipation of changes in cabin conditions before they occur. It may be usefully applied to other fields of air conditioning where arduous conditions are met, such as in land transport for mountainous or arctic areas, or high performance industrial systems, e.g., air conditioned test rooms.

What we claim is:

1. An air conditioning system for controlling the air supply to an enclosure comprising:

temperature-responsive means responsive to the air temperature in the enclosure and delivering a first variable pulse train signal wherein the number of pulses occurring in unit time represents the actual temperature in said enclosure;

reference signal-generating means delivering a second pulse train signal wherein the number of pulses occurring in unit time represents a desired temperature for said enclosure;

a digital comparator receiving said first and second pulse train signals and having first and second output channels, the comparator being operative to deliver output pulses the number of which occurring in unit time represents the difference between actual temperature and desired temperature, said output pulses appearing on said first output channel if the frequency of pulses in said actual temperature signal pulse train exceeds the frequency of pulses in said reference signal pulse train, said output pulses appearing on said second signal channel if the frequency of pulses in said reference signal pulse train exceeds the frequency of pulses in said actual temperature signal pulse train;

a digital logic network receiving and processing the output pulses on said first and second output channels from said digital comparator, said logic network having at least three phase channels operative in response to said output pulses to deliver processed pulses sequentially in said channels at a rate proportional to the pulse frequency of said output pulses received from the comparator, said processed pulses being delivered by said phase channels in one sequence if the comparator output pulses appear on its first comparator output channel and in the reverse sequence if the comparator pulses appear on its second output channel;

a fluid flow control valve controlling flow of air in a duct leading to said enclosure;

a digital valve actuator operative to change the position of said valve by moving it through a discrete increment in response to each processed pulse delivered thereto on said at least three phase channels by said digital logic network, said actuator operating at a speed determined by the rate of delivery of said processed pulses on said phase channels and in one direction or the reverse direction according to whether the pulses applied to said phase channels are in said one sequence or said reverse sequence.

2. A system according to claim 1, wherein the digital logic network comprises fluidic logic components.

3. A system according to claim 1, wherein the comparator comprises fluidic logic components.

4. A system according to claim 1, wherein the comparator receives a first pneumatic pulse signal from the temperature responsive means having a pulse frequency representative of the temperature being monitored, and a second pneumatic pulse signal from said reference signal generating means having a pulse frequency representative of said desired temperature, and delivers its output in the form of a pneumatic pulse train on one of said first and second channels.

5. A systemm according to claim 1, wherein the temperature responsive means is an acoustic device comprising a resonant tube delivering a pneumatic pressure output that oscillates at a frequency representative of the temperature being monitored.

6. A system according to claim 1, wherein the valve actuator is a pneumatically-operated stepping motor.

* * * * *